Patented Dec. 29, 1925.

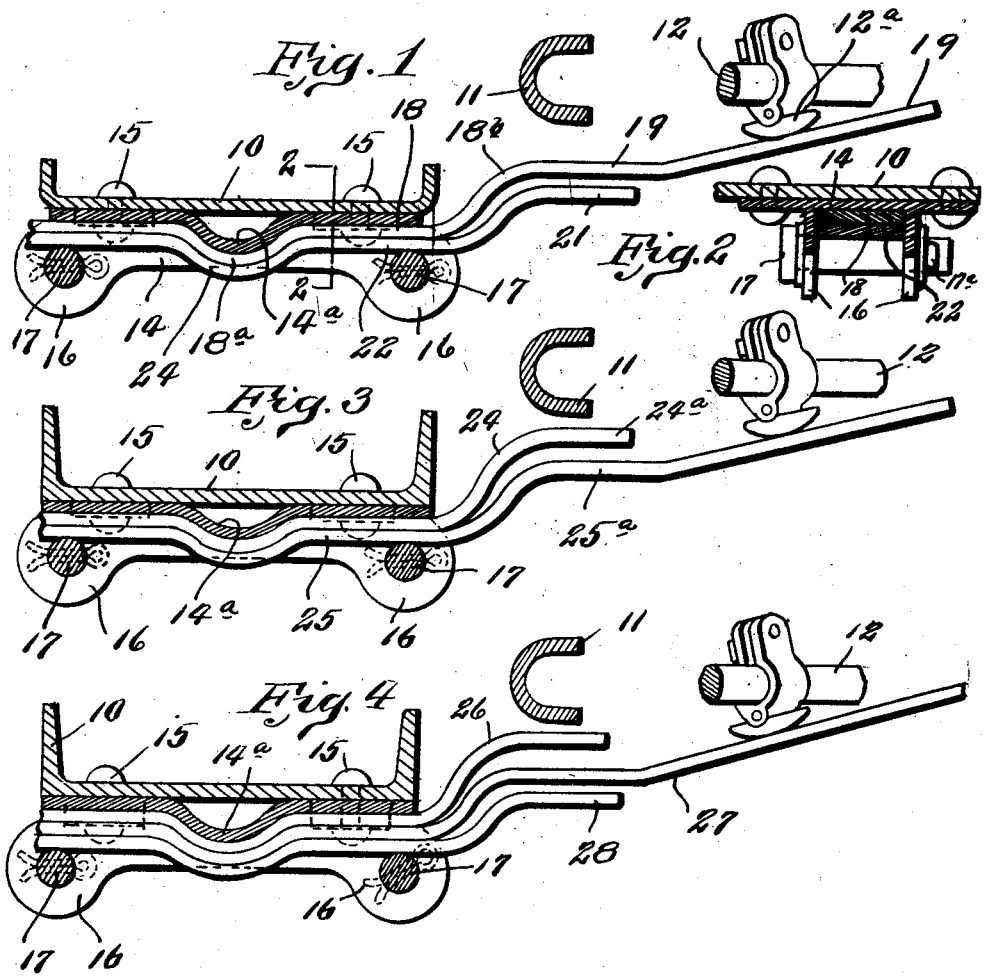

1,567,788

UNITED STATES PATENT OFFICE.

FREDERIC T. DE LONG, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SAFETY SUPPORT.

Application filed July 19, 1924. Serial No. 726,976.

*To all whom it may concern:*

Be it known that I, FREDERIC T. DE LONG, a citizen of the United States, residing at Chicago, Illinois, have invented a certain new and useful Improvement in Safety Supports, of which the following is a specification, such as will enable others skilled in the art to which it appertains to make and use the same.

This invention relates to new and useful improvements in safety supports for brake beams and the objects of the invention are to provide a safety support which yieldingly supports one end of the brake beam and is adapted to form a rigid support for the other end of said beam.

Further objects of the invention are to provide a safety support for brake beams comprising a yielding member for supporting the front end of the brake beam and an auxiliary member adapted to support the rear end of said beam.

Still further objects of the invention are to provide a safety device for trussed brake beams comprising an attaching bracket adapted to be secured to a part of a truck and carrying a resilient member for yieldingly supporting the tension member of said beam and an auxiliary member extending under the compression member of said beam and normally spaced therefrom and from said yielding member and adapted to form an auxiliary support for said brake beam when the latter is displaced from its normal position.

With these and other objects in view, my invention consists in certain novel features of construction and arrangement of parts, hereinafter more fully described and claimed, and illustrated in the accompanying drawings, in which—

Figure 1 is an elevational view, partly in section, of my improved safety support.

Figure 2 is a transverse cross section taken on line 2—2 of Figure 1.

Figure 3 is an elevational view, partly in section, of a modified form of a safety support.

Figure 4 is an elevational view of still another modified form.

The purpose of the present invention is the provision of a safety support having a rigid portion adjacent to the spring plank and below the compression member of the brake beam so as to successfully withstand the strains and shocks in case the brake hanger breaks and the brake beam drops, and having a yielding portion extending under the tension member of the brake beam and yieldingly supporting said brake beam.

The preferred form of my invention consists of a track member, preferably formed resilient, and an auxiliary member which may be resilient or rigid, said members having their medial portions nested together and secured to a part of the car truck and having their ends spaced from each other whereby said auxiliary member under normal conditions does not come into engagement with said yielding member and therefore does not impair the resiliency thereof. These members are of unequal lengths, the auxiliary member extending under the compression member of the beam and terminating short of said yielding member which extends under the tension member of the beam.

Referring by numerals to the accompanying drawings, 10 indicates a spring plank of a car truck. 11 indicates a compression member and 12 a tension member of a brake beam. A bracket 14 having a curved portion 14$^a$ is secured to the spring plank in any suitable manner, such as rivets 15, and is provided with depending ears or lugs 16 apertured to receive pins 17 which can be held against removal by cotter pins 17$^a$.

Referring more particularly to Figures 1 and 2, 18 designates a yielding supporting member having a central portion provided with a bend 18$^a$ adapted to be nested with the curved portion 14$^a$ of bracket 14. Extending from this central portion are resilient ends 19 which are inclined upwardly and form tracks for chairs 12$^a$ carried by tension members 12. The yielding portions 19 at their point of junction with the central portion are formed with curved portions 18$^a$ which provide greater flexibility for said yielding portions and also serve to space the same from the ends 21 of an auxiliary member 22, which latter is nested with the central portion of member 18 and has a bend 24 cooperating with the curved or bent portion 18$^a$ of member 18. Normally, the ends 21 are separated from the yielding ends of member 18 and do not affect in any manner said yielding portions. However, when the brake beam falls, either through the breakage of the brake hanger or through some other cause, the weight of the brake beam depresses member 18 so that the latter comes to rest on the portions 21 of an auxiliary member 22 which reinforces said yielding member and prevents any further displacement of the brake beam.

In Figures 1 and 2 the reinforcing member is located below the yielding member and is spaced therefrom and adapted to engage it.

In the modified form shown in Figure 3, an auxiliary member 24 is located above a yielding member 25 and has its ends 24ª spaced from portions 25ª of said member so as not to affect the yielding movement thereof. In case of displacement of the brake beam, the rear end thereof is arrested by one of the ends 24ª of said member 24 and is prevented from dropping to the ground and relieves the yielding member of the shock.

In the modified form shown in Figure 4 which is a combination of forms shown in Figures 1 and 3, an auxiliary member 26 is disposed above and spaced from a track member 27 and an auxiliary member 28 is disposed below and spaced from said track member. The upper member 26 is designed to catch and support the compression member of the beam and the auxiliary member 28 is arranged to reinforce the track member 27 and member 26. These reinforcing members also act as guides and prevent excessive movements of track member 27 in either direction.

In the forms above disclosed, the auxiliary members may be either of rigid construction or they may be formed resilient, as desired. In either case, they reinforce the track member, which is preferably resilient but can be formed rigid, and said reinforcing members form an auxiliary support for the brake beam.

It is obvious that other changes in the construction and arrangement of parts of my improved safety support can be made and substituted for those herein shown and described, without departing from the nature and scope of my invention.

I claim:

1. A safety support for brake beams comprising a resilient track member, and an auxiliary member adapted to cooperate with and reinforce said resilient member.

2. A safety support for brake beams comprising a yielding member for yieldingly supporting the tension member of a brake beam, and an auxiliary member in cooperative relation with said yielding member and adapted to form a support for the compression member of said beam.

3. A safety support for brake beams comprising a yielding member forming a yielding track support for said beam, and an auxiliary member normally inoperative and adapted to cooperate with and reinforce said yielding member.

4. A safety support for brake beams comprising a plurality of members, one of which is resilient and forms a yielding support for the tension member of a brake beam and the other of said members terminates short of said yielding member and is adapted to reinforce said yielding member and support the compression member of said beam.

5. A safety support for brake beams comprising a yielding member for yieldingly supporting the tension member of a brake beam, an auxiliary rigid member in cooperative relation with said yielding member and adapted to rigidly support the compression member of said beam, and means for attaching said members in position.

6. A safety support for brake beams comprising an attaching bracket, a yielding member, and a rigid member nested with said bracket and held against relative longitudinal movement, said members being formed adjacent to their points of attachment with curved portions which normally separate the respective ends of said members from each other.

7. In a car construction, the combination with a part of a truck, of a bracket secured thereto, a resilient member carried by said bracket for yieldingly supporting the tension member of a brake beam, and an auxiliary rigid member carried by said bracket and adapted to catch and support the compression member of said beam.

8. In a car construction, the combination with a part of a truck, of a bracket secured thereto, a resilient member carried by said bracket for yieldingly supporting the tension member of a brake beam, an auxiliary rigid member carried by said bracket and adapted to catch and support the compression member of said beam, and means for securing said members to said bracket.

9. A safety support for brake beams comprising a track member for supporting the tension member of a brake beam and an auxiliary member normally disengaged from said brake beam and adapted in emergency to engage the compression member of said brake beam and prevent displacement thereof.

10. A safety support for brake beams comprising a track member adapted to be secured to a truck part for supporting the tension member of a brake member and an auxiliary member adapted to be supported by a truck part and arranged to engage and support the compression member of said brake beam when the latter's normal support is disabled.

In testimony whereof I hereunto affix my signature this 14th day of July, 1924.

FREDERIC T. DE LONG.